Feb. 24, 1953 W. P. HOFFMANN 2,629,360
CALF FEEDING DEVICE
Filed July 31, 1950
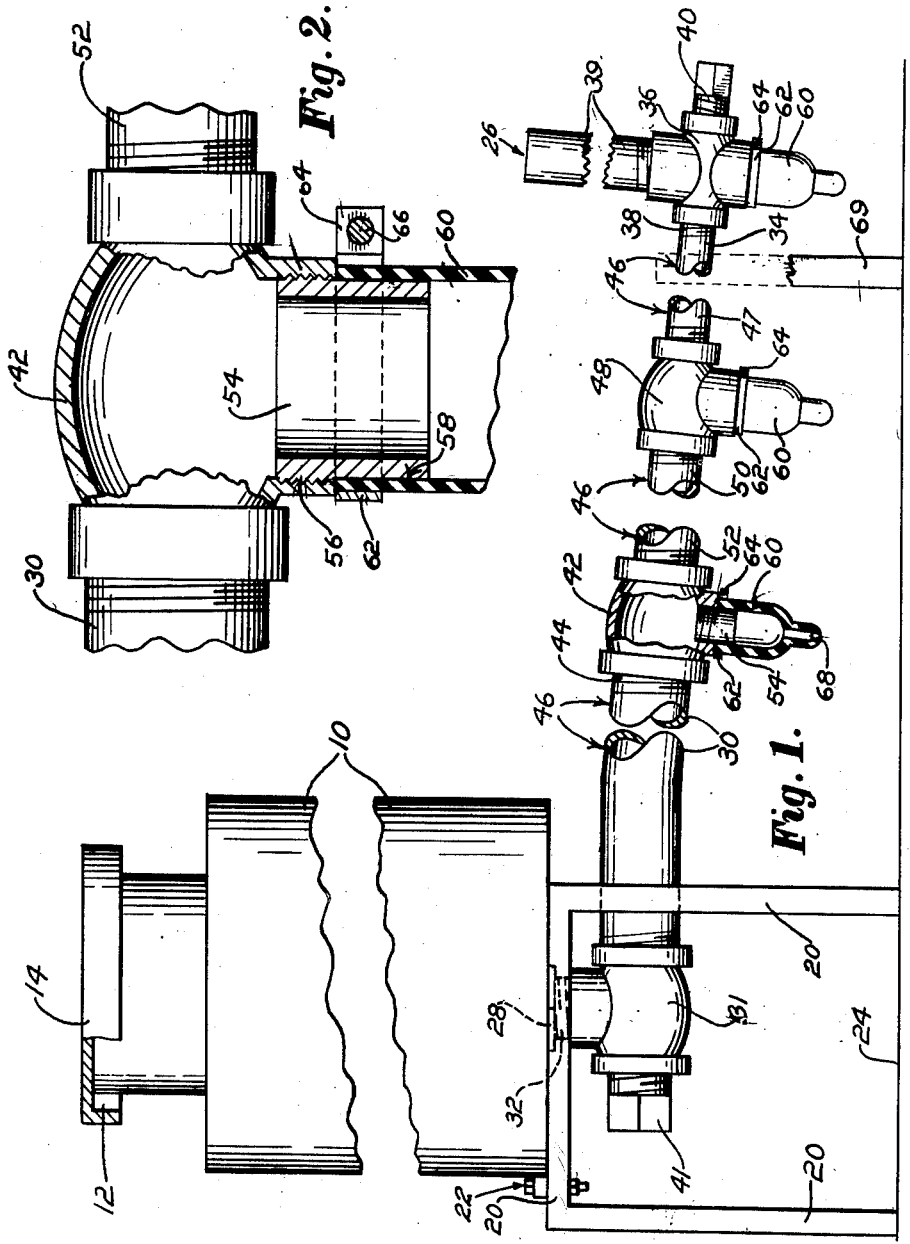
W. P. Hoffmann INVENTOR.
BY Arthur H. Sturges
Attorney.

Patented Feb. 24, 1953

2,629,360

UNITED STATES PATENT OFFICE 2,629,360

CALF FEEDING DEVICE

Walter P. Hoffmann, La Motte, Iowa

Application July 31, 1950, Serial No. 176,864

1 Claim. (Cl. 119—71)

The present invention relates to animal husbandry and more particularly to cattle.

It is an object of the invention to provide a device of economical construction particularly adapted for use for feeding calves.

Another object of the invention is to provide a device for the said purpose which may be readily transported from one field or feeding lot to another.

An important object of the invention is to provide a device which is so constructed that a calf being fed and located at the end of a milk delivery conduit employed will receive a fair share or approximately as much of the milk from the milk container of the device as the calf closely adjacent to said container.

A still further object of the invention is to provide a device which is so constructed that the interior thereof may be readily cleaned and sterilized at desired times.

Further objects and advantages of the invention will be understood from the following detailed description thereof.

In the drawings:

Figure 1 is a side elevation of the new device, certain portions thereof being broken away and others appearing in section.

Figure 2 is an elevational view with the parts shown on an enlarged scale, showing the connection of one of the rubber nipples to one of the reducing T's, with parts broken away and shown in section and with the section taken on the longitudinal center of the pipe of the feeder.

Referring now to the drawings for a more particular description in which like numerals of reference designate like or corresponding parts.

10 indicates a container of a suitable size and shape such that it will contain 50 to 100 gallons of milk.

The container 10 is provided with a mouth or intake port 12 having a removable cover cap 14 for preventing rain, snow and foreign substances from entering the interior of the container.

The cover cap 14 is loosely disposed on the neck 16 of the container, so that air may freely enter the container proportional to the quantity of milk which flows outwardly of the container as later described.

The bottom of the container is horizontally disposed in use whereby the major longitudinal axis of the container is vertically disposed.

A platform, support or suitable pedestal indicated at 20 is employed having a horizontally disposed upper surface upon which the bottom of the container cooperatively rests during use whereby the container is maintained above the surface of the soil 24 of a feeding lot or the like a suitable distance.

Suitable means, such as bolts 22, or the like may be employed for securing the container to the pedestal 20 and it will be understood that during use the container is maintained vertically disposed in such a manner that calves or livestock are prevented from upsetting the container.

Adjacent the bottom the latter is provided with an outlet and a floor flange 28 or the like is secured to the bottom of the container 10 below said outlet whereby the T 31 of the first section or main pipe 30 of a later described conduit or pipe may be screw threadedly attached to a nipple extended from the floor flange as indicated at 32.

The outermost or end section of the said conduit is indicated at 34 and a cross 36 is screw threadedly attached thereto as at 38. A vent pipe 39 is attached to the cross and the upper end 26 of the member 39 is disposed above the upper portion of the container 10 in use.

A pipe plug 40 is screw threadedly attached to an outlet of the cross 36 as shown in Figure 1 and a similar pipe plug 41 is attached to the T 31 as shown.

A reducing T 42 is threadedly attached to the outwardly disposed end portion 44 of the first section 30.

The section 30 is of greater diameter than the end section 34. Also the T 42 is of greater capacity and size than the cross 36 of the end section 34.

Between the first section or main pipe 30 and the end section 34 any desired number of intermediate sections or pipes are provided and complemental to the number of calves to be fed.

The said conduit is generally indicated at 46 and said conduit includes the fittings 36 and 42, together with the intermediate T 48.

As shown in Figure 1, the T 48 is of a lesser diameter than the T 42 of the first section 30 and of a greater capacity than the cross 36 of the section 34.

It will be understood that any number of T's and sections may be employed complemental to the number of calves to be fed and that for convenience of illustration but three T's, together with their adjunct parts are depicted.

As shown in Figure 1 the section 34 is of a lesser diameter and capacity than the section 47 and the latter is of a lesser capacity than the section 50.

The section 52 is similarly of a lesser diameter than the section 30 said particular arrangement of parts being provided for purposes later described.

As shown in Figure 1 each T is provided with an outlet and since said outlets are of like construction with respect to each other but one thereof is minutely described herein.

Referring to Figure 2 the T 42 is provided with a sleeve or nipple 54 screw threadedly attached thereto as at 56. The nipple is provided with an end portion having a smooth annular wall 58.

A suitable flexible rubber nipple as indicated by the numeral 60 and having a tip of reduced diameter is provided having an open end portion, the latter being snugly disposed around the smooth annular wall portion 58 of the member 54.

The nipple 60 is of any desired length being secured to the member 54 by a suitable means such as the clamp 62.

The hose clamp is conventional having oppositely disposed ears 64. The ears are each provided with like apertures and a bolt 66 or other suitable keeper is disposed through the apertures of the ears. The hose clamp 62 encircles the nipple adjacent the open end of the latter whereby at times when the draw bolt is manipulated the said ears are moved toward each other for clamping the parts together.

A like nipple 60 is provided for each of the T's of the conduit 46.

As best shown in Figure 1 the tip of the nipple 60 of the T 42 is provided with a restricted outlet 68 and it will be understood that the other nipples 60 are provided with similar outlets, respectively. The restricted outlets 68 are of the self closing type having meeting thin rubber edges, as shown in Figure 1, where the rubber nipple is shown in section, and wherein the edges open by suction, such as that resulting from a calf drawing on the nipple.

It will be understood that since the conduit 46 is elongated proportional to the number of calves to be fed that the last section 34 of the conduit is provided with a support such as the support 69 whereby livestock are prevented from damaging the conduit.

It is essential to the practice of the invention that the conduit 46 be inclinedly disposed downwardly from the container 10 toward the last section 34 thereof whereby the milk from the container 10 readily flows downwardly through the conduit by operation of gravity.

At times when it is desired to sterilize or clean the conduit the pipe plugs 40 and 41 may be removed for permitting an elongated ramrod-like sterilized swab to be run through said conduit. Milk from the container 10 will readily flow to the free end of the conduit since the vent pipe 39 permits the same, whereby air escapes from the conduit through the upper end of the vent pipe 39 to the atmosphere at times when the milk flows to the outermost end section of the conduit from the container 10, thereby insuring that calves disposed along the conduit equally receive milk from the distributor container.

Among other advantages of the particular construction of the conduit it is believed pertinent to mention that the same may be formed primarily of pipe fittings and it will be understood that the nipples 60 of the conduit 46 are approximately equidistantly spaced apart a distance such that during use the nipples may be readily grasped by a calf and without interference from the next adjacent calf.

In operation, assuming that the container 10 is full of milk and in the event that no calves are feeding, it will be understood that the restricted outlets 68 of the nipple 60 are sufficiently minute to prevent milk from flowing therethrough by force of gravity said outlet 68 being depicted comparatively large in the drawing for convenience of illustration.

During use, the nipples being disposed in the mouths of calves the latter move the flexible nipples back and forth and around and about in approximately the same manner that a calf moves a teat of a mother cow for withdrawing milk from said cow.

During said movement the sides of the nipples become compressed and expanded thereby causing milk to flow from the outlets 68 of the nipples.

It will be seen that, due to the particular construction of the conduit, at times when the latter is full of milk the end section 34 of the conduit, together with the nipple 60 carried thereby is provided with an adequate supply of milk due to the progressively stepped diameters of the sections of the conduit and the cooperative vent pipe 39, whereby a calf using the nipple of the end section receives approximately the same amount of milk as any of the other calves using the new device.

From the foregoing description it is thought to be obvious that a calf feeding device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a calf feeder, the combination which comprises a storage tank having an outlet nipple extended from the lower end, a T threaded on said outlet nipple, a clean out plug threaded into one end of the T, a main pipe having an offset section therein threaded in the opposite end of said T and in alignment with said plug, a reducing T threaded on the opposite end of said main pipe, an end pipe of a smaller diameter than the main pipe threaded into and extended from said reducing T, a cross threaded on the extended end of said end pipe, a clean out plug threaded into the end of the cross opposite to that threaded on the intermediate pipe, said plugs and pipes being aligned, a vent pipe threaded into said cross and extended upwardly to a point above the storage tank, nipples threaded into and extended from the cross and reducing T, respectively, tubular rubber nipples with tips of reduced diameter on the outer ends positioned on the nipples of the cross and reducing T, said tips of the nipples having self-closing openings in the ends thereof, and clamps positioned around said rubber nipples for retaining the rubber nipples on the nipples extended from the cross and reducing T.

WALTER P. HOFFMANN.

REFERENCES CITED

The following references are of record in the file of this patent:

UNITED STATES PATENTS

| Number | Name | Date |
|---|---|---|
| 274,379 | Reed | Mar. 20, 1883 |
| 662,384 | Armstrong | Nov. 27, 1900 |
| 1,402,739 | Clark et al. | Jan. 10, 1922 |
| 2,034,968 | Bartlett | Mar. 24, 1936 |